US007275238B2

(12) United States Patent
Anaya et al.

(10) Patent No.: US 7,275,238 B2
(45) Date of Patent: Sep. 25, 2007

(54) PROGRAM EVENT ACTIVATED AND CONFIGURED DEBUGGER METHOD, SYSTEM, ARTICLE OF MANUFACTURE, COMPUTER PROGRAM PRODUCT, AND DATA STRUCTURE

(75) Inventors: Francisco Miguel Anaya, Hollister, CA (US); Thomas Lee Ellis, Morgan Hill, CA (US); Randy Earl Kraemer, Versailles, KY (US); Antony John Piner, South Wonston (GB)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/113,602

(22) Filed: Mar. 28, 2002

(65) Prior Publication Data

US 2003/0188042 A1 Oct. 2, 2003

(51) Int. Cl.
G06F 9/44 (2006.01)
(52) U.S. Cl. .................. 717/129; 717/124; 717/127
(58) Field of Classification Search ............... 717/124, 717/127–129
See application file for complete search history.

(56) References Cited

U.S. PATENT DOCUMENTS

| 4,080,650 | A | * | 3/1978 | Beckett .................. 717/129 |
| 5,455,949 | A | | 10/1995 | Conder et al. .............. 395/700 |
| 5,533,192 | A | | 7/1996 | Hawley et al. ........ 395/183.04 |
| 5,611,043 | A | * | 3/1997 | Even et al. .................. 714/38 |
| 5,630,137 | A | | 5/1997 | Carney et al. .............. 395/678 |
| 5,632,032 | A | | 5/1997 | Ault et al. .................. 395/670 |
| 5,724,564 | A | | 3/1998 | Conder et al. .............. 395/581 |

(Continued)

FOREIGN PATENT DOCUMENTS

CA 2219886 * 4/1999

(Continued)

OTHER PUBLICATIONS

Tomlinson, P.; Debugging Services (Understanding NT) (Technology Tutorial), *Windows Developer's Journal*, n8, v7, Aug. 1996 p. 55 (5).

*Primary Examiner*—Meng-Al T. An
*Assistant Examiner*—Jason Mitchell
(74) *Attorney, Agent, or Firm*—Konrad Raynes & Victor LLP; David W. Victor (57) ABSTRACT

An executing computer program is debugged by the use of an events table comprising a plurality of table entries, each table entry comprising an event description describing an event occurring during execution of the executing computer program; a debugger description specifying a debugger to be invoked to debug the executing computer program upon an occurrence of the event; and debugger options to be passed to the debugger upon invocation of the debugger. Debugging the executing computer program comprises monitoring for the event; detecting the event; gathering event information beyond the event description; searching the event table responsive to the detection of the event; finding the table entry corresponding the event; responsive to the finding of the table entry, invoking the debugger specified by the debugger description in the table entry corresponding the event; passing the debugger options to the debugger; and passing the event information to the debugger. A first table entry may be used to invoke a first debugger responsive to a first event, and a second table entry may be used to invoke a second debugger responsive to a second event.

17 Claims, 4 Drawing Sheets

U.S. PATENT DOCUMENTS

| | | | |
|---|---|---|---|
| 5,774,729 A | 6/1998 | Carney et al. | 395/707 |
| 5,850,562 A | 12/1998 | Crump et al. | 395/800 |
| 6,253,368 B1 | 6/2001 | Nelin et al. | 717/4 |
| 6,256,777 B1 * | 7/2001 | Ackerman | 717/129 |
| 6,324,683 B1 | 11/2001 | Fuh et al. | 717/4 |
| 6,493,868 B1 * | 12/2002 | DaSilva et al. | 717/105 |
| 6,543,049 B1 * | 4/2003 | Bates et al. | 717/129 |
| 6,751,583 B1 * | 6/2004 | Clarke et al. | 703/17 |
| 6,842,811 B2 * | 1/2005 | Barry et al. | 710/260 |
| 2001/0002473 A1 * | 5/2001 | Waldo et al. | 709/229 |
| 2001/0032305 A1 * | 10/2001 | Barry | 712/34 |

FOREIGN PATENT DOCUMENTS

JP          61016344 A2     1/1986

* cited by examiner

PROGRAM EVENT ACTIVATED AND CONFIGURED DEBUGGER METHOD, SYSTEM, ARTICLE OF MANUFACTURE, COMPUTER PROGRAM PRODUCT, AND DATA STRUCTURE

A portion of the Disclosure of this patent document contains material which is subject to copyright protection. The copyright owner has no objection to the facsimile reproduction by anyone of the patent document or the patent disclosure, as its appears in the Patent and Trademark Office patent file or records, but otherwise reserves all copyright rights whatsoever.

BACKGROUND OF THE INVENTION

1. Field of the Invention

The present invention relates in general to computer programs, and more particularly to an automatic activation and configuration of a debugger.

2. Description of the Related Art

Conventional systems provide numerous ways of invoking a debugger. A user may manually invoke a debugger by entering a command on a command line or by selecting an icon representing the debugger in a graphical user interface. Alternatively, the user may automate the invocation of the debugger by the use of various flags, control statements, or calling statements.

Crump et al., U.S. Pat. No. 5,850,562, "Personal Computer Apparatus and Method for Monitoring Memory Locations States for Facilitating Debugging of Post and BIOS Code," and Nelin et al., U.S. Pat. No. 6,253,368, "Dynamically Debugging User-Defined Functions and Stored Procedures" teach the use of flags to invoke a debugger. In Crump et al., a flag is checked when a system is initialized, and if the flag is set, then a default debugger is invoked. Nelin et al. provides improved use of a flag wherein the flag indicates that a default debugger is invoked when a particular program is executed.

The use of control statements may provide greater control and function. For example, Tomlinson, Paula *"Debugging Services (Understanding NT) (Technology Tutorial)"*, *Windows Developer's Journal, Number* 8, Volume 7, August, 1996, page 55, teaches an improvement beyond the system initialization flag wherein a system initialization control statement invokes both a specified program and a specified debugger with which to debug the program. Carney et al., U.S. Pat. No. 5,774,729, "Event Handling in a High Level Programming Language Environment" extends such control statement teachings beyond system initialization to the initialization of an individual program wherein a control statement which invokes the program may also invoke a specified debugger with which to debug the program.

Instead of a control statement external to the program, Yoshio, JP61016344A2, "Conversational Debugging Processing System" teaches the use of a calling statement within the program to be debugged that invokes a specified debugger with which to debug the program. Fuh et al., U.S. Pat. No. 6,324,683, "System, Method and Program for Debugging External Programs in Client/Server-Based Relational Database Management Systems" teaches the use of such a calling statement within a segment of code inserted before the program to be debugged.

Rather than associating the debugger with a particular program, Hawley et al., U.S. Pat. No. 5,533,192, "Computer Program Debugging System and Method" teaches associating the debugger with a particular type of exception or interrupt, thus invoking a specified debugger when a specified type of exception or interrupt occurs. Other exception handlers, condition handlers, or event handlers which do not invoke a debugger, but instead use an already executing debugger are taught by Conder et al., U.S. Pat. No. 5,724,564, "Computer Program Product and Program Storage Device for Representing and Signaling Run-Time Program Conditions"; Carney et al., U.S. Pat. No. 5,630,137, "Condition Handling in a Multi-Language Computer Program"; Conder et al., U.S. Pat. No. 5,455,949, "Method for Representing and Signaling Run-Time Program Conditions"; and Ault et al., U.S. Pat. No. 5,632,032, "Cross Address Space Thread Control in a Multithreaded Environment".

These conventional ways of invoking a debugger suffer significant limitations and disadvantages. The use of flags which may invoke the debugger before the program or event of interest may cause significant unnecessary overhead associated with the execution of the debugger incurred during the time before the program or event of interest. The resolution of the meaning of the flags is also limited. The flags may only indicate a default debugger, not a selection of a particular debugger, and not the configurable parameters of a particular debugger. The flags may only indicate a particular program, not events within the program.

Control statements also share these limitations as control statements may invoke the debugger before the program or event of interest causing significant unnecessary overhead associated with the execution of the debugger incurred during the time before the program or event of interest. Although the control statement resolution is greatly improved over that of the debugger flags in that they may specify a particular debugger instead of just the default debugger, the control statements still may only indicate a particular program, not events within the program.

Finally, the exception handlers may fail to reduce the overhead associated with the execution of the debugger incurred during the time before the event of interest in the program of interest. Although an exception handler may invoke a specific debugger for a particular type of exception or interrupt, it may invoke the debugger for every exception or interrupt of this type, not just the particular exception or interrupt of interest, thus resulting in significant debugger overhead. It may also invoke the debugger for every exception or interrupt of this type, even if the exception or interrupt occurs outside of the program of interest. Significant debugger overhead may be incurred if the event of interest is not an exception or interrupt as the debugger may be invoked by events other than the event of interest in order to monitor the event of interest. The exception handler may also fail to configure the debugger invocation with the appropriate debugger options or parameters.

Thus, there is a clearly felt need for improved debugging in which a user may specify a particular event within a particular program which causes a specified debugger to be invoked with specified debugger options.

SUMMARY OF THE INVENTION

Preferred embodiments of the present invention comprise a method, system, article of manufacture, computer program product, and data structure for debugging an executing computer program.

In accordance with a preferred embodiment of the present invention, an executing computer program is debugged by the use of an events table comprising a plurality of table entries, each table entry comprising an event description describing an event occurring during execution of the executing computer program and describing the executing computer program; a debugger description specifying a debugger to be invoked to debug the executing computer program upon an occurrence of the event; and debugger options to be passed to the debugger upon invocation of the debugger. Debugging the executing computer program comprises monitoring for the event; detecting the event; gathering event information beyond the event description; searching the event table responsive to the detection of the event; finding the table entry corresponding the event; responsive to the finding of the table entry, invoking the debugger specified by the debugger description in the table entry corresponding the event; passing the debugger options to the debugger; and passing the event information to the debugger. A first table entry may be used to invoke a first debugger responsive to a first event, and a second table entry may be used to invoke a second debugger responsive to a second event.

A preferred embodiment of the present invention has the advantage of providing improved debugging.

A preferred embodiment of the present invention has the advantage of providing improved selection of a debugger.

A preferred embodiment of the present invention has the advantage of providing improved selection of events for debugging.

A preferred embodiment of the present invention has the advantage of providing improved selection of a program to be debugged.

A preferred embodiment of the present invention has the advantage of providing improved selection of both a debugger and program events to be debugged.

A preferred embodiment of the present invention has the advantage of providing improved invocation of a debugger before an event of interest.

A preferred embodiment of the present invention has the advantage of reducing the time during which a debugger is active.

A preferred embodiment of the present invention has the advantage of reducing the overhead associated with a debugger.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
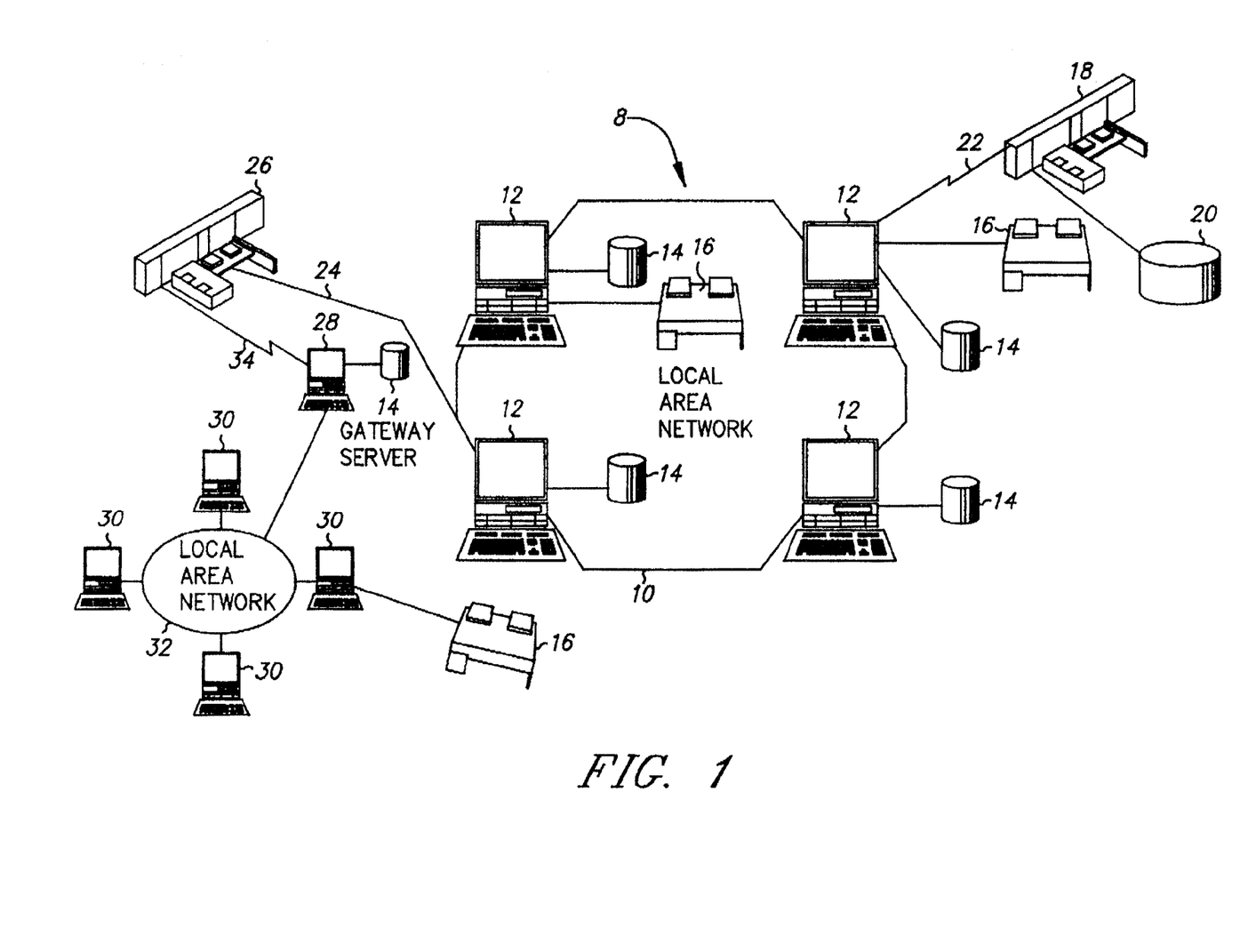
FIG. 1 is a block diagram of a distributed computer system used in performing a method of a preferred embodiment of the present invention, forming part of an apparatus of a preferred embodiment of the present invention, storing a data structure of a preferred embodiment of the present invention, and which may use an article of manufacture comprising a computer-readable storage medium having a computer program embodied in said medium which may cause the computer system to practice a preferred embodiment of the present invention.

With reference now to the figures, and in particular with reference to FIG. 1, there is depicted a pictorial representation of a distributed computer system 8 which may be utilized to implement a method, system, article of manufacture, data structure, and computer program product of preferred embodiments of the present invention. As may be seen, distributed computer system 8 may include a plurality of networks 10 and 32, which may be Local Area Networks (LAN), intranet networks, or internet networks, each of which preferably includes a plurality of individual computers 12 and 30, respectively. Of course, those skilled in the art I will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the present invention, to store the various computer programs which may be accessed and executed by a user within the distributed computer system 8, in accordance with the present invention. In a manner well known in the prior art, each such computer program may be stored within a storage device 14.

Still referring to FIG. 1, it may be seen that distributed computer system 8 may also include multiple mainframe computers, such as mainframe computer 18, which may be preferably coupled to Local Area Network 10 by means of communication link 22. Mainframe computer 18 may also be coupled to a storage device 20 which may serve as remote storage for Local Area Network 10 which may be coupled via communications controller 26 and communications links 24 and 34 to a gateway server 28. Gateway server 28 is preferably an individual computer or Intelligent Work Station which serves to link Local Area Network 32 to Local Area Network 10.

As discussed above with respect to Local Area Network 32 and Local Area Network 10, a plurality of server computer programs may be stored within storage device 20 and executed by mainframe computer 18. Similarly, a plurality of client computer programs may be stored within storage devices 14 and executed by individual computers 12 such that distributed client/server computer programs are provided. Of course, those skilled in the art will appreciate that the mainframe computer 18 may be located a great geographical distance from Local Area Network 10, and similarly, Local Area Network 10 may be located a substantial distance from Local Area Network 32. That is, Local Area Network 32 may be located in California while Local Area Network 10 may be located within Texas and mainframe computer 18 may be located in New York.

As will be appreciated upon reference to the foregoing, it is often desirable for a user within one portion of distributed data processing system 8 to execute computer programs on one or more portions of data processing system 8. For example, the user may execute a Java client computer program on computer 12 which requests services from a CICS® transaction server program executing on mainframe 18 which further requests services from a DB2® database server executing on computer 30 (CICS® and DB2® are registered trademarks of International Business Machines Corporation in the United States, other countries, or both. Java is a trademark of Sun Microsystems, Inc. in the United States, other countries, or both.). To verify the proper operation of such a distributed set of client/server programs, the user may wish to debug the distributed set of client/server programs. However, different debuggers may be more appropriate for each of the platforms 12, 18, and 30, or different debuggers may be more appropriate for each of the different types of programs (Java, CICS, and DB2). Alternatively, the user may only be interested in debugging particular events, and different debuggers may be more appropriate for each of the events. Even if a particular debugger is appropriate for multiple events, different debugger options may be more appropriately invoked for each of the events. Thus, there is a clearly felt need for improved debugging in which a user may specify an event which causes a specified debugger to be invoked with specified debugger options.

Figure 2:
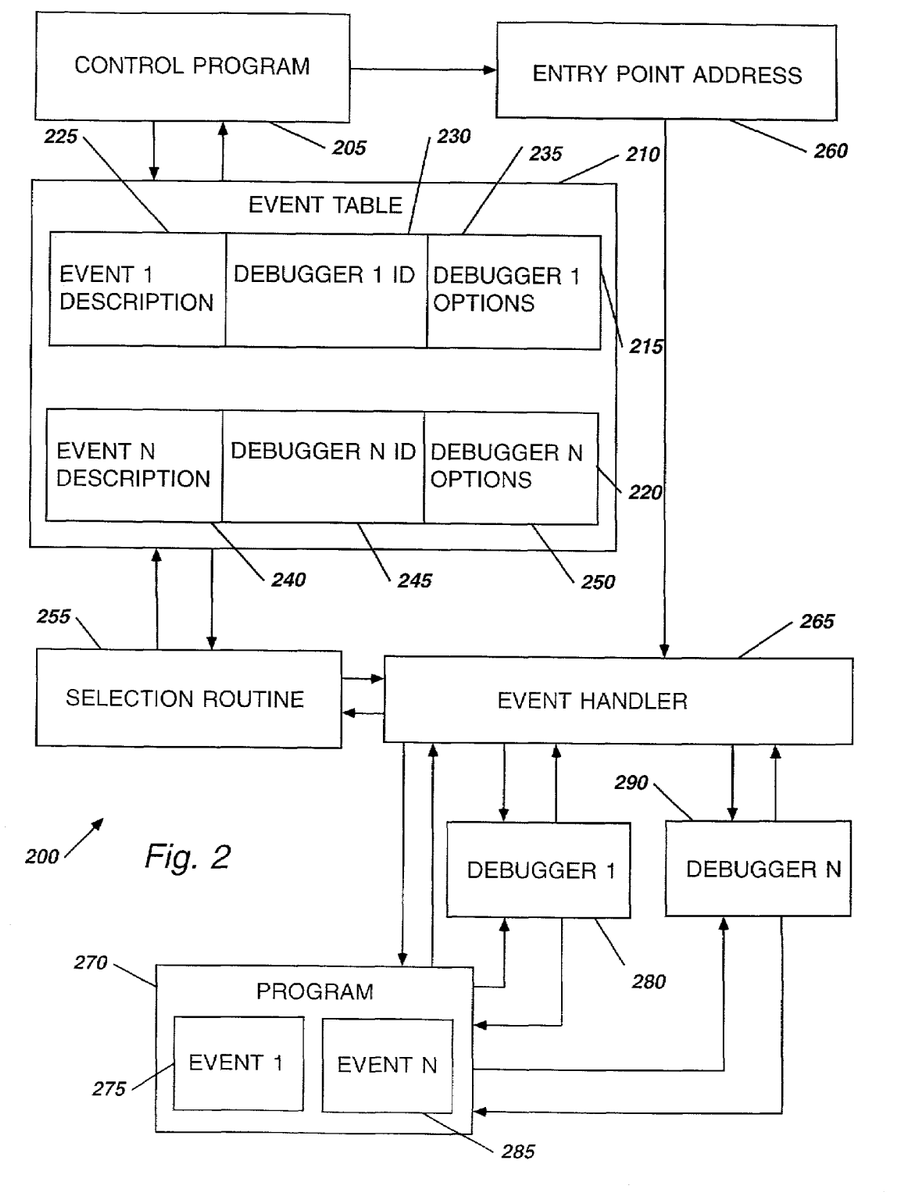
FIG. 2 is a block diagram of a preferred embodiment of the present invention.

Referring now to FIG. 2, a block diagram 200 of a preferred embodiment of the present invention is illustrated. A user may use the preferred embodiment to debug an executing program 270. The user is particularly interested in an event 275 which may occur during the execution of the program 270. The user is not as interested in other events occurring during the execution of the program 270 and prefers to reduce the overhead and execution time associated with a debugger 280 to that debugging associated with the debugging of event 275.

A control program 205 interfaces with the user and initializes the preferred embodiment. This initialization comprises loading an events table 210, a selection routine 255, and an event handler 265. The events table 210 comprises a table entry 215 which stores information relevant to the event 275 and the debugger 280 which the user prefers to use to debug the event 275. The information stored in the events table entry 215 comprises an event description 225, a debugger description 230, and debugger options 235. The event description 225 stores a description of an event which may occur during execution of the program 270 and may also store a description or identification of the program 270. The debugger description 230 specifies that debugger 280 will be invoked if this event 275 occurs during the execution of the program 270, and the debugger will be invoked with the debugger options 235. If this information is not already stored in the events table 210, then the user may interact with the control program 205 to specify the information.

During this initialization, the control program 205 loads the selection routine 255 which uses the events table 210 to implement the user's selection of an event 275 and the user's selection of a corresponding debugger 280 for the event 275. The control program also stores an entry point address 260 of the selection routine 255 to be used for subsequent invocations of the selection routine 255.

The event handler 265 is also loaded by the control program 205. The event handler 265 monitors the execution of the program 270 for an occurrence of an event, and invokes the selection routine 255 upon such an occurrence. The selection routine 255 uses the event table 210 to determine if the event is one which should load the debugger 280. The user may also select both other events and other debuggers. For example, the user may specify that debugger 280 be invoked upon the occurrence of event 275, and that debugger 290 be invoked upon the 1131, occurrence of event 285. In which case, the events table 210 comprises an additional table entry 220 comprising an event description 240, a debugger description 245, and debugger options 250.

Figure 3:
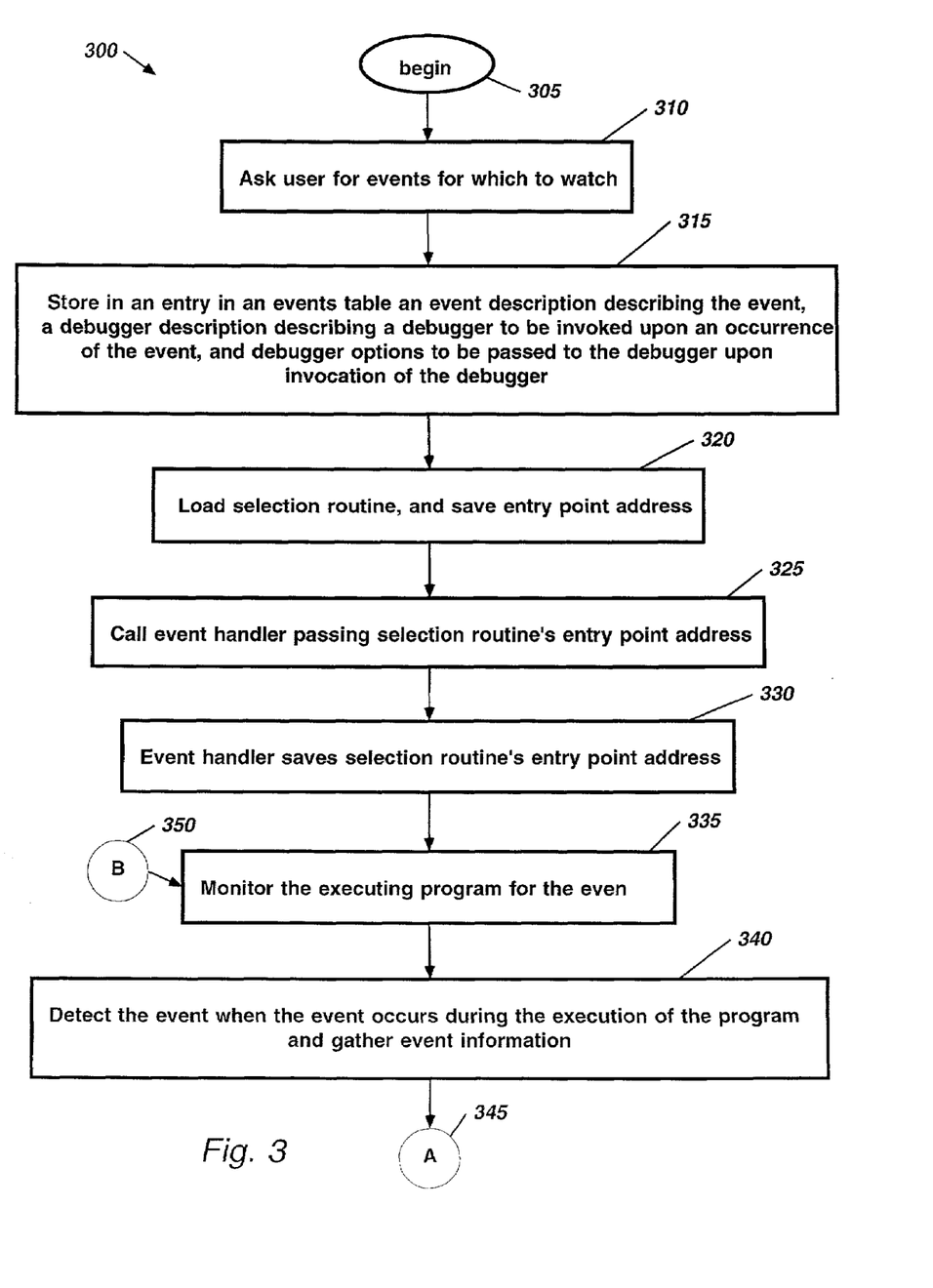
FIG. 3 and FIG. 4 are flowcharts of method steps preferred in carrying out a preferred embodiment of the present invention.
Figure 4:
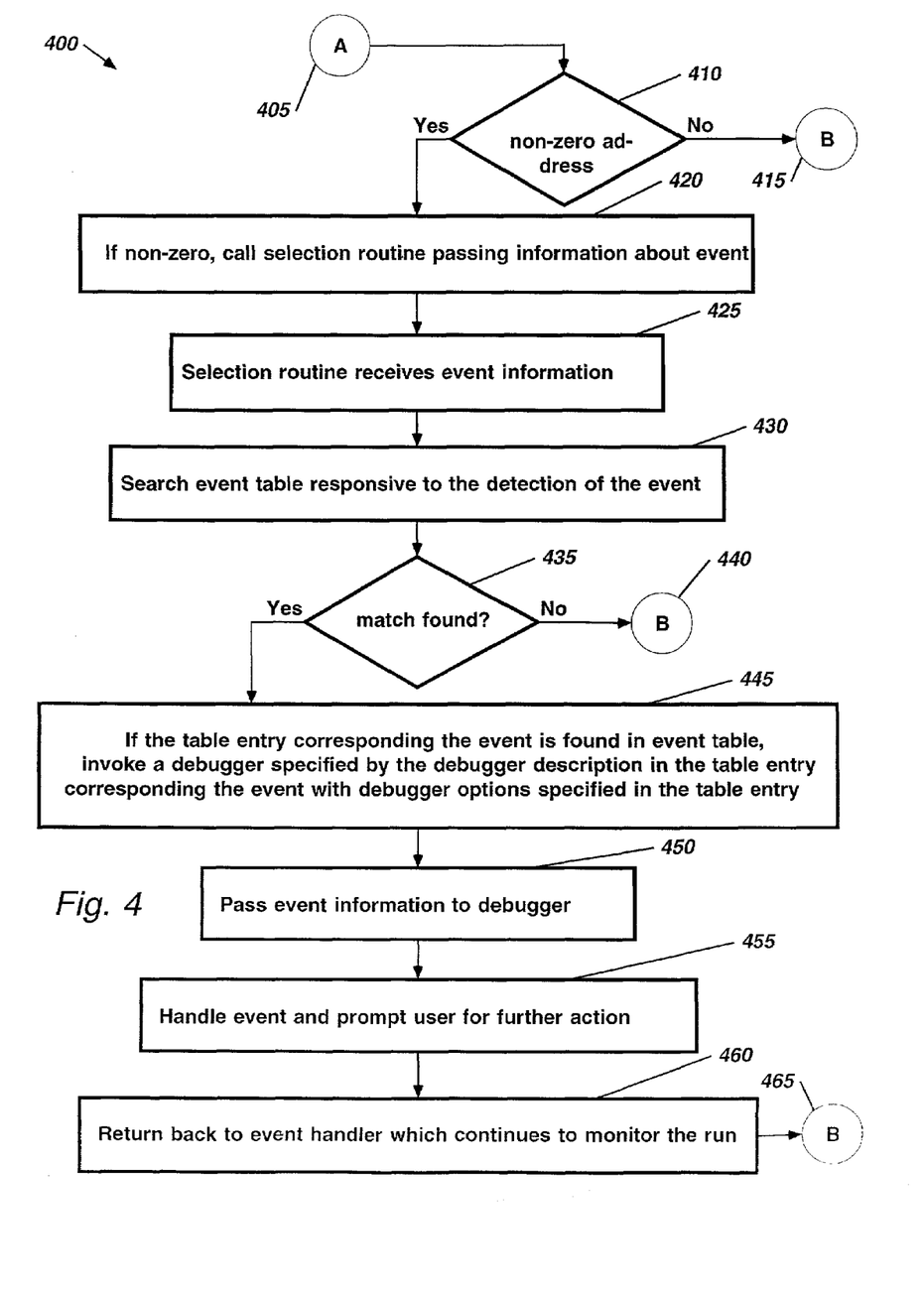

Referring now to FIGS. 3 and 4, the flowcharts 300 and 400 illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

After the start 305 of the process 300, process block 310 of the control program 205 asks the user for those events for which the process should watch and monitor, and process block 315 stores these events in the events table 210. For example, the user may specify that event 275 as described in event description 225 should cause debugger 280 as described in debugger description 230 to be invoked with options and parameters as described in debugger options 235. Alternatively, if the user does not specify any events, then the process may either continue with events previously stored in the events table 210, or the process may proceed with no specified events in the events table 210.

Thereafter, process block 320 causes the control program 205 to load the selection routine 255, and to save the selection routine's 255 entry point address 260. If there are no events to detect, and the events table 210 is empty, then the control program 205 may store a zero in the entry point address 260 to indicate this condition to the event handler 265. The control program 205 in process block 325 then calls event handler 265 passing the selection routine's 255 entry point address 260, and the event handler 265 saves the selection routine's entry point address 260, process block 330. After being called, the event handler 265 in process block 335 monitors the execution of the program 270 for an occurrence of an event such as the event 275. When the event 275 occurs, the event handler 265 detects the event 275 and gathers event information in process block 340. Responsive to the detection of the event 275, control passes to decision block 410 on FIG. 4, illustrated by flowchart connectors A, 345 on FIG. 3 and 405 on FIG. 4. Decision block 410 determines if the selection routine's entry point address 260 is non-zero. If the selection routine's entry point address 260 is nonzero, then process block 420 calls the selection routine 255 passing the gathered event information. After receiving the event information in process block 425, the selection routine 255 in process block 430 searches the event table 210 for an event description 225 corresponding to the detected event 275. Thereafter, decision block 435 checks if a match is found during the search of the event table 210. If a match is found, then process block 445 responsive to the finding of the table entry 215, invokes a debugger 280 specified by the debugger description 230 in the table entry 215 corresponding to the event 275. Event information is passed to the debugger 280 by process block 450, and the debugger 280 handles the event 275 and prompts the user for further action in process block 455. After the user completes the debugging actions, then process block 460 returns control back to the event handler 265 which continues to monitor the executing program 270. This processing path is illustrated by flowchart connectors B, 465 on FIG. 4 and 350 on FIG. 3.

Returning now to decision block 410, if the selection routine's entry point address 260 is zero, then there are no events in the event table 210, and processing returns to process block 335 which continues to monitor the executing program 270, illustrated by flowchart connectors B 415 on FIG. 4 and 350 on FIG. 3.

Returning now to decision block 435, if there is no matching entry in the events table corresponding to the detected event, then processing returns to process block 335 which continues to monitor the executing program 270, illustrated by flowchart connectors B 440 on FIG. 4 and 350 on FIG. 3.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims. User input may be received from the keyboard, mouse, pen, voice, touch screen, or any other means by which a human can input data to a computer, including through other programs such as application programs, databases, data sets, or files.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

We claim:

1. An article of manufacture for use in a computer system for debugging an executing computer program on the computer system, said article of manufacture comprising a computer-useable storage medium having a computer program embodied in said medium which causes the computer system to perform operations comprising:

storing table entries in an events table, wherein each table entry includes an event description and debugger description, wherein the event description describes an event occurring during execution of the executing computer program and the debugger description indicates a debugger to invoke for the event in the table entry, wherein different table entries describe different debuggers to invoke for different events, and wherein a plurality of the events table entries indicate options to pass to the debugger indicated in the debugger description for the entry;

monitoring for one of a plurality of events that occur during execution of the computer program;

detecting one of the events;

searching the events table responsive to the detection of the event to determine one table entry whose event description comprises the detected event;

responsive to finding the table entry when searching the events table, invoking a debugger specified by the debugger description in the determined table entry to debug the executing computer program with respect to the detected event;

passing debugger options indicated in the table entry to the invoked debugger indicated in the table entry when invoking the debugger; and returning to monitoring for events without invoking any debugger in response to not finding one table entry whose event description comprises the detected event upon searching the events table.

2. The article of manufacture of claim 1 wherein the embodied computer program embodied in said medium can further cause operations comprising passing event information to the debugger.

3. The article of manufacture of claim 2 wherein the embodied computer program embodied in said medium can further cause operations comprising gathering event information beyond the event description.

4. The article of manufacture of claim 1 wherein the embodied computer program embodied in said medium can further cause operations comprising:

invoking a first debugger specified by a first debugger description in a first table entry corresponding to a first event; and invoking a second debugger specified by a second debugger description in a second table entry corresponding to a second event.

5. The article of manufacture of claim 1, wherein the operations of monitoring for the event and detecting the event are performed by an event handler and wherein the operations of searching the events table and finding the table entry are performed by a selection routine, further comprising:

saving an entry point address of the selection routine for the event handler to use to call the selection routine if the event is detected; and setting the entry point address to a value indicating that there are no events to detect if the events table is empty, wherein the events handler continues to monitor for the event in response to determining that the entry point address for the selection routine indicates that there are no events to detect.

6. A method of debugging an executing computer program on a computer readable medium in a computer system, said method comprising:

storing table entries in an events table, wherein each table entry includes an event description and debugger description, wherein the event description describes an event occurring during execution of the executing computer program and the debugger description indicates a debugger to invoke for the event in the table entry, wherein different table entries describe different debuggers to invoke for different events, and wherein a plurality of the events table entries indicate options to pass to the debugger indicated in the debugger description for the entry;

monitoring for one of a plurality of events that occur during execution of the computer program;

detecting one of the events;

searching the events table responsive to the detection of the event to determine one table entry whose event description comprises the detected event responsive to finding the table entry when searching the events table, invoking a debugger specified by the debugger description in the determined table entropy debug the executing computer program with respect to the detected event;

passing debugger options indicated in the table entry to the debugger indicated in the table entry when invoking the debugger; and returning to monitoring for the event without invoking any debugger in response to not finding one table entry whose event description comprises the detected event upon searching the events table.

7. The method of claim 6, further comprising passing event information to the debugger.

8. The method of claim 7, further comprising gathering event information beyond the event description.

9. The method of claim 6, further comprising:

invoking a first debugger specified by a first debugger description in a first table entry corresponding to a first event; and invoking a second debugger specified by a second debugger description in a second table entry corresponding to a second event.

10. The method of claim 6, wherein the operations of monitoring for the event and detecting the event are performed by an event handler and wherein the operations of searching the events table and finding the table entry are performed by a selection routine, further comprising:

saving an entry point address of the selection routine for the event handler to use to call the selection routine if the event is detected; and setting the entry point address to a value indicating that there are no events to detect if the events table is empty, wherein the events handler continues to monitor for the event in response to determining that the entry point address for the selection routine indicates that there are no events to detect.

11. A computer system, with a processor, for debugging an executing computer program on the computer system, said computer system comprising:

an events table having events table entries, wherein each table entry includes an event description and a debugger description, said event description describing an event occurring during execution of the executing computer program and the debugger description indicating a debugger to invoke for the event in the table entry, wherein different table entries describe different debuggers to invoke for different events, and wherein a plurality of the events table entries indicate options to pass to the debugger indicated in the debuQcler description for the entry;

a computer readable medium including:

computer program instructions for monitoring for one of a plurality of events that occur during execution of the computer program;

computer program instructions for detecting one of the events;

computer program instructions for searching the events table responsive to the detection of the event to determine one table entry whose event description comprises the detected event;

computer program instructions, responsive to finding the table entry when searching the events table, for invoking a debugger specified by the debugger description in the determined table entry to debug the executing computer program with respect to the detected event;

computer program instructions for passing debugger options indicated in the table entry to the debugger indicated in the table entry when invoking the debugger; and computer program instructions for returning to monitoring for the event without invoking any debugger in response to not finding one table entry whose event description comprises the detected event upon searching the events table.

12. The computer system of claim 11, further comprising computer program instructions for passing event information to the debugger.

13. The computer system of claim 12, further comprising computer instructions for gathering event information beyond the event description.

14. The computer system of claim 11, further comprising:

computer instructions for invoking a first debugger specified by a first debugger description in a first table entry corresponding to a first event; and computer instructions for invoking a second debugger specified by a second debugger description in a second table entry corresponding to a second event.

15. The system of claim 11, wherein the computer program instructions for monitoring for the event and detecting the event are implemented in an event handler and wherein the computer program instructions for searching the events table and finding the table entry are implemented in a selection routine, wherein the computer readable medium further includes:

computer program instructions for saving an entry point address of the selection routine for the event handler to use to call the selection routine if the event is detected; and computer program instructions for setting the entry point address to a value indicating that there are no events to detect if the events table is empty, wherein the events handler continues to monitor for the event in response to determining that the entry point address for the selection routine indicates that there are no events to detect.

16. A data structure stored on a computer-useable storage medium, said data structure comprising:

an events table comprising a plurality of table entries, wherein table entries comprise:

an event description describing an event occurring during execution of an executing computer program;

a debugger description specifying a debugger to be invoked to debug the executing computer program upon an occurrence of the event indicated in the table entry, wherein different table entries indicate different debuggers to invoke for different events; and debugger options to be passed to the debugger upon invocation of the debugger indicated in the events table entry, wherein upon detecting one event while monitoring execution of the program, searching the events table for an entry for the detected event, wherein the debugger specified for the table entry is invoked upon finding the table entry whose event description indicates the detected event, and wherein execution returns to monitoring for the event without invoking any debugger in response to not finding one table entry whose event description comprises the detected event upon searching the events table.

17. The data structure of claim 16 comprising:

a first table entry corresponding to a first event comprising a first event description describing the first event, a first debugger description specifying a first debugger to be invoked upon an occurrence of the first event, and first debugger options to be passed to the first debugger upon invocation of the first debugger; and a second table entry corresponding to a second event comprising a second event description describing the second event, a second debugger description specifying a second debugger to be invoked upon an occurrence of the second event, and second debugger options to be passed to the second debugger upon invocation of the second debugger.

* * * * *